United States Patent
Lee et al.

(10) Patent No.: US 12,347,900 B2
(45) Date of Patent: Jul. 1, 2025

(54) COLD START CONTROL METHOD AND SYSTEM FOR FUEL CELL VEHICLES

(71) Applicants: HYUNDAI MOTOR COMPANY, Seoul (KR); KIA CORPORATION, Seoul (KR)

(72) Inventors: Young Man Lee, Gwangju-si (KR); Jong Gyun Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 535 days.

(21) Appl. No.: 17/893,346

(22) Filed: Aug. 23, 2022

(65) Prior Publication Data

US 2023/0268527 A1     Aug. 24, 2023

(30) Foreign Application Priority Data

Feb. 24, 2022 (KR) ........................ 10-2022-0024437

(51) Int. Cl.
*H01M 8/04* (2016.01)
*H01M 8/04223* (2016.01)
(Continued)

(52) U.S. Cl.
CPC ... *H01M 8/04268* (2013.01); *H01M 8/04225* (2016.02); *H01M 8/04302* (2016.02);
(Continued)

(58) Field of Classification Search
CPC ......... H01M 8/04268; H01M 8/04225; H01M 8/04302; H01M 8/04358; H01M 8/04701; H01M 2250/20
(Continued)

(56) References Cited

U.S. PATENT DOCUMENTS

2012/0122004 A1* 5/2012 Jeon .................. H01M 8/04947
                                                        417/32
2017/0008420 A1* 1/2017 Kim ........................ B60L 58/12
(Continued)

FOREIGN PATENT DOCUMENTS

KR      10-1782353 B1     9/2017

OTHER PUBLICATIONS

Amamou et al. Real time adaptive efficient cold start strategies for PEMFC. Applied Energy, vol. 216, 2018, pp. 21-30. Retrieved from https://www.sciencedirect.com/science/article/pii/S0306261918301909 (Year: 2018).*

(Continued)

*Primary Examiner* — James M Erwin
(74) *Attorney, Agent, or Firm* — MCDONNELL BOEHNEN HULBERT & BERGHOFF LLP (57) ABSTRACT

A cold start control method and system for fuel cell vehicles determines when the fuel cell vehicle is started, whether the fuel cell vehicle enters a cold start mode. An estimated time estimated to be required until the stopped vehicle coolant temperature, which is measured in a state in which the fuel cell vehicle is stopped before being started, reaches a reference temperature is derived. The required time required from a point in time at which the stopped vehicle coolant temperature is measured to a point in time at which the fuel cell vehicle enters the cold start mode is derived. A target heating value is corrected according to a ration between the estimated time and the required time to derive a final target heating value. The heating value of the fuel cell stack is caused to reach the final target heating value.

14 Claims, 3 Drawing Sheets

(51) Int. Cl.
    *H01M 8/04225*    (2016.01)
    *H01M 8/04302*    (2016.01)
    *H01M 8/0432*     (2016.01)
    *H01M 8/04701*    (2016.01)

(52) U.S. Cl.
    CPC ... *H01M 8/04358* (2013.01); *H01M 8/04701* (2013.01); *H01M 2250/20* (2013.01)

(58) Field of Classification Search
    USPC .......................................................... 429/404
    See application file for complete search history.

(56) References Cited

U.S. PATENT DOCUMENTS

| | | | |
|---|---|---|---|
| 2021/0028468 A1* | 1/2021 | Lee | H01M 8/04302 |
| 2022/0209265 A1* | 6/2022 | Won | H01M 8/04358 |
| 2022/0255100 A1* | 8/2022 | Vallur Rajendran | H01M 8/04753 |

OTHER PUBLICATIONS

Rios et al. Efficient thermal management strategies for cold starts of PEMFC system. Applied Energy, vol. 279, 2020, 115813. Retrieved from https://www.sciencedirect.com/science/article/pii/S0306261920312939 (Year: 2020).*

* cited by examiner

COLD START CONTROL METHOD AND SYSTEM FOR FUEL CELL VEHICLES

CROSS REFERENCE TO RELATED APPLICATIONS

The present application claims priority to Korean Patent Application No. 10-2022-0024437, filed Feb. 24, 2022, the entire contents of which are incorporated herein for all purposes by this reference.

BACKGROUND

Field of the Disclosure

The present disclosure relates generally to a cold start control method and system for fuel cell vehicles, and particularly, to a method and system for preventing unnecessary heat emission from a fuel cell stack by correcting a target heating value of a fuel cell stack derived according to a temperature region of the fuel cell stack, which is derived according to a temperature region of a fuel cell stack coolant when entering cold start.

Description of the Related Art

Fuel cell vehicles include a fuel cell system that plays a role like an engine of an internal combustion engine vehicle, and that produces electricity required to drive a vehicle. The fuel cell system is equipped with a fuel cell stack that converts heat energy into electricity energy using a chemical reaction of oxygen and hydrogen. In an anode (or an oxidation electrode), hydrogen that is a fuel is oxidized, and thus hydrogen ions and electrons are generated. The anode hydrogen ions penetrate an electrolyte membrane inside the stack, and move to a cathode (or a reduction electrode). The migrated hydrogen ions meet the oxygen existing in the cathode to generate water. In this case, the electrons fail to penetrate the electrolyte membrane, and generate electric energy while migrating from the anode to the cathode through an external conducting wire.

Meanwhile, the fuel cell vehicles in which the fuel cell system is included require fuel cell output for travelling. The fuel cell stack is supplied with hydrogen and oxygen, and produces electric energy equivalent to necessary output. However, when the fuel cell vehicle is started with the fuel cells left in a low-temperature environment, and require the fuel cell output, target output of the fuel cell stack is impossible to be generated, which has an influence on degradation and durability of the fuel cell stack. Thus, the fuel cell vehicle enters a step for a cold start mode that is a start mode other than a normal start mode. A criterion for entering a cold start is decided by the temperature of a coolant that flows to the fuel cell stack. A target heating value of the fuel cell stack is derived according to the temperature of the fuel cell stack coolant, and internal heat emission of the fuel cell stack is induced on the basis of the target heating value.

However, there is a problem with the case where the target heating value of the fuel cell stack is derived by only the temperature of the fuel cell stack coolant when entering the cold starting step for the purpose of travelling of the fuel cell vehicle. Especially, in a case that the stoppage interval of a vehicle is short, the temperature of the coolant is apt to be sharply changed depending on an outdoor temperature, but a width in change of an internal temperature of the fuel cell stack is not great. Thus, if the target heating value of the fuel cell stack is derived at a low outdoor temperature, which corresponds to the temperature of the fuel cell stack coolant, there is a problem in that a more heating value than the required heating value of the fuel cell stack is derived. Further, if the heating value of the fuel cell stack becomes excessive, there is a problem in that a serious damage is done of durability of the fuel cell stack. Further, if excessive fuel is used for internal heat emission of the fuel cell stack, there is a problem in that fuel efficiency of the fuel cell vehicle becomes lower.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to prevent heat emission from a fuel cell stack by deriving a target quantity of the heat emission from the fuel cell stack in a temperature region that is divided according to a temperature of a fuel cell stack coolant when entering cold start.

In order to achieve the above objective, according to one aspect of the present disclosure, a cold start control method for fuel cell vehicles includes the steps of determining, by a controller, whether or not to enter a cold start mode when the vehicle is started, calculating, by the controller, a target heating value according to a fuel cell stack coolant temperature when entering a cold start mode of the vehicle, deriving, by the controller, an estimated time that is estimated to be required until the stopped vehicle coolant temperature measured in a state in which the vehicle is stopped reaches the reference temperature; deriving, by the controller, the required time required from a point in time at which the stopped vehicle coolant temperature is measured from a point in time at which the fuel cell vehicle measures the stopped vehicle coolant temperature to a point in time at which the fuel cell vehicle enters the cold start mode, correcting, by the controller, the target heating value according to a ratio between the estimated time and the required time to derive a final target heating value and by the controller, controlling the fuel cell system such that the heating value of the fuel cell stack reaches the final target heating value.

In the step of calculating the target heating value, the plurality of temperature regions exist, and the target heating value can be calculated according to a temperature region in which the temperature of the fuel cell stack coolant belongs when the fuel cell vehicle enters the cold start mode.

The temperature regions may be set according to a section.

A minimum heating value is calculated as a basic value in the plurality of temperature regions, and the temperature is lowered, thereby the target heating value can be increased.

In the step of deriving the time, use may be made of a data table in which the temperature of the fuel cell stack coolant and the outdoor temperature are input to output the estimated time.

A plurality of data tables of the estimated times may be provided to correspond to a plurality of temperature regions.

In the step of deriving the time, the controller is subjected to wake-up in every control period during stopping the vehicle, and the estimated time can be derived whenever the controller is subjected to wake-up.

When a change in coolant temperature of the fuel cell stack is large in comparison with previous wake-up, the periodic time may be set to be short.

When the estimated time is derived whenever the controller is subjected to wake-up, estimated time data derived at the time of previous wake-up is deleted, and derived new estimated time data can be stored.

The derived estimated time may be one data that corresponds to each temperature region in the data table for the plurality of temperature regions.

In the step of deriving the time, a point in time at which the stopped vehicle coolant temperature of the required time is measured may correspond to a point in time at which the stopped vehicle coolant temperature is finally derived during stop of the fuel cell vehicle.

In the step of deriving the final target heating value, a ratio of the required time to the estimated time may be used as a correction coefficient.

The final target heating value corrected by multiplying the obtained correction coefficient to the existing target heating value can be derived.

In order to accomplish the above objective, a cold start control system for a fuel cell vehicle according to the present disclosure includes a coolant temperature sensor configured to measure a temperature of a fuel cell stack coolant, and a controller configured to calculate a target heating value according to a temperature of the fuel cell stack coolant when the fuel cell vehicle enters a cold start mode, derive an estimated time that is required from a point in time at which the stopped vehicle coolant temperature measured in a vehicle stop state before being started reaches a reference temperature, drive a required time that is required from a point in time at which the stopped vehicle coolant temperature is measured to a point in time at which the fuel cell vehicle enters a cold start mode, correct a target heating value according to a ratio between the estimated time and the required time, and control the fuel cell system such that the heating value of the fuel cell stack reaches the final target heating value.

According to the cold start control method and system for the fuel cell vehicle of the present disclosure, the cold start control method and system have an effect of making data for an estimated time at which a fuel cell stack internal temperature enters a temperature region on the basis of a coolant temperature of a fuel cell stack and an outdoor temperature when entering a cold start mode and optimizing a target heating value through a ratio between an estimated time and a required time that are taken until it is actually determined that the vehicle enters the cold start mode, and thereby preventing unnecessary fuel cell stack heating and degradation of the durability of the fuel cell stack.

Further, by optimizing the target heating value, the cold start control method and system have an effect of preventing fuel consumption caused by unnecessary use of a fuel.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
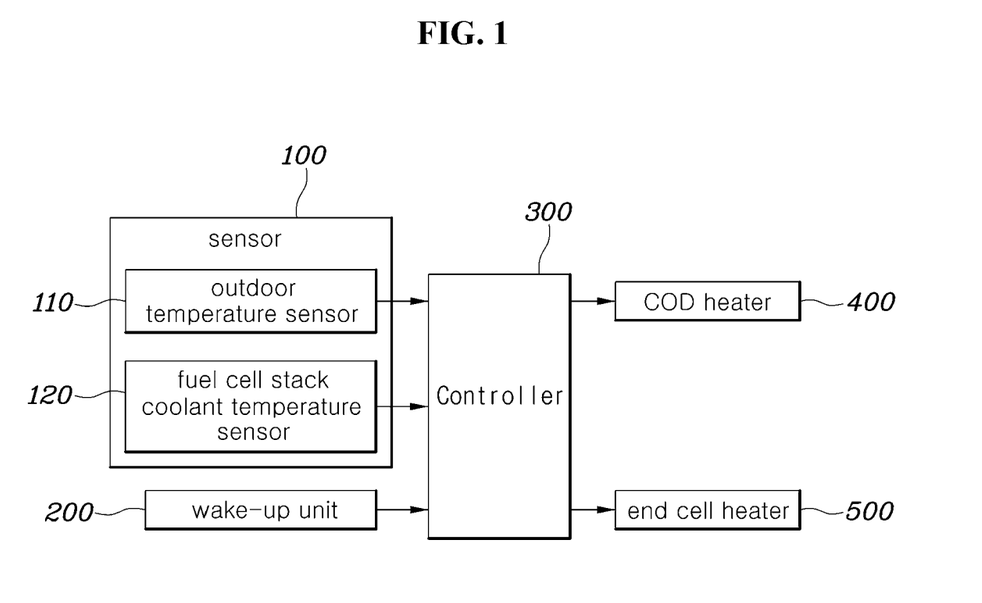
FIG. 1 is a configuration diagram illustrating a cold start control system for a fuel cell vehicle according to an embodiment of the present disclosure.
Figure 2:
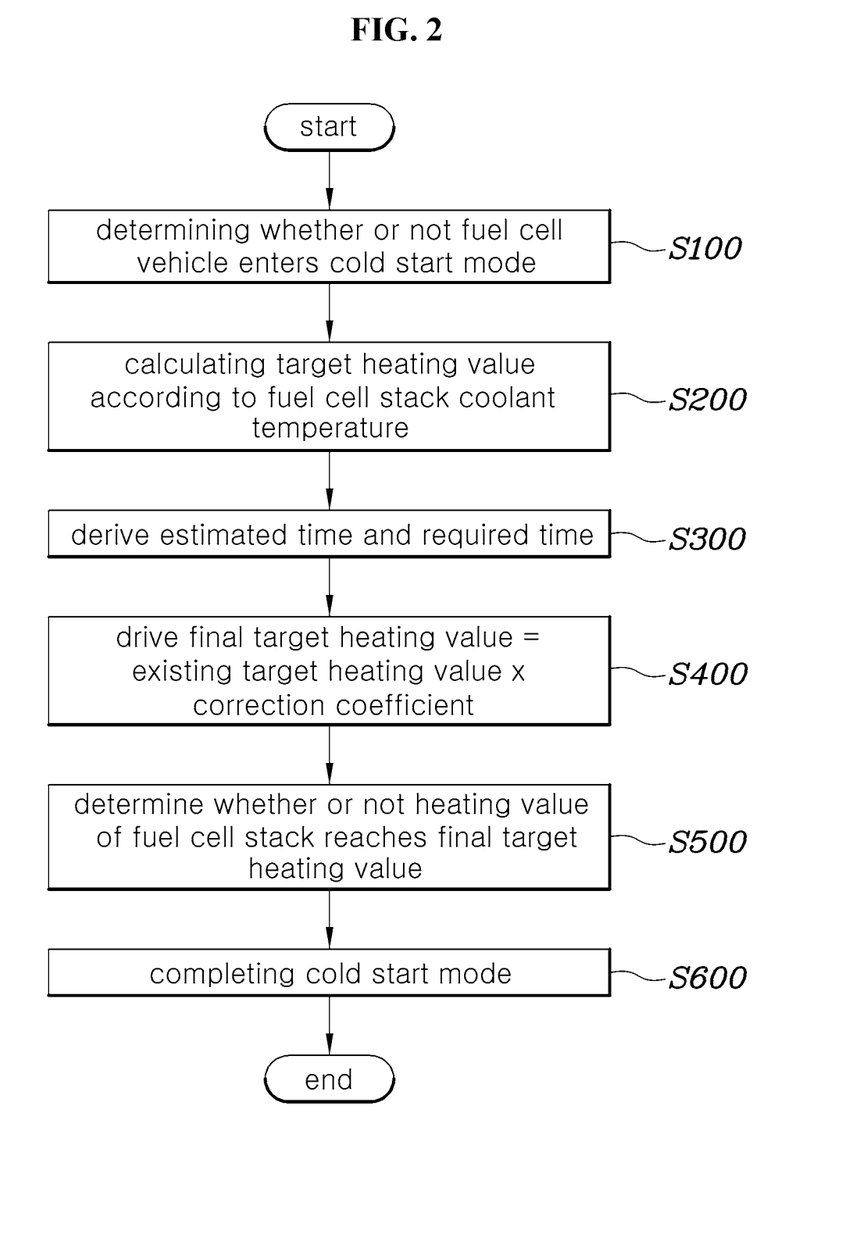
FIG. 2 is a flowchart illustrating a cold start control method for a fuel cell vehicle, which is performed by a controller, according to an embodiment of the present disclosure.
Figure 3:
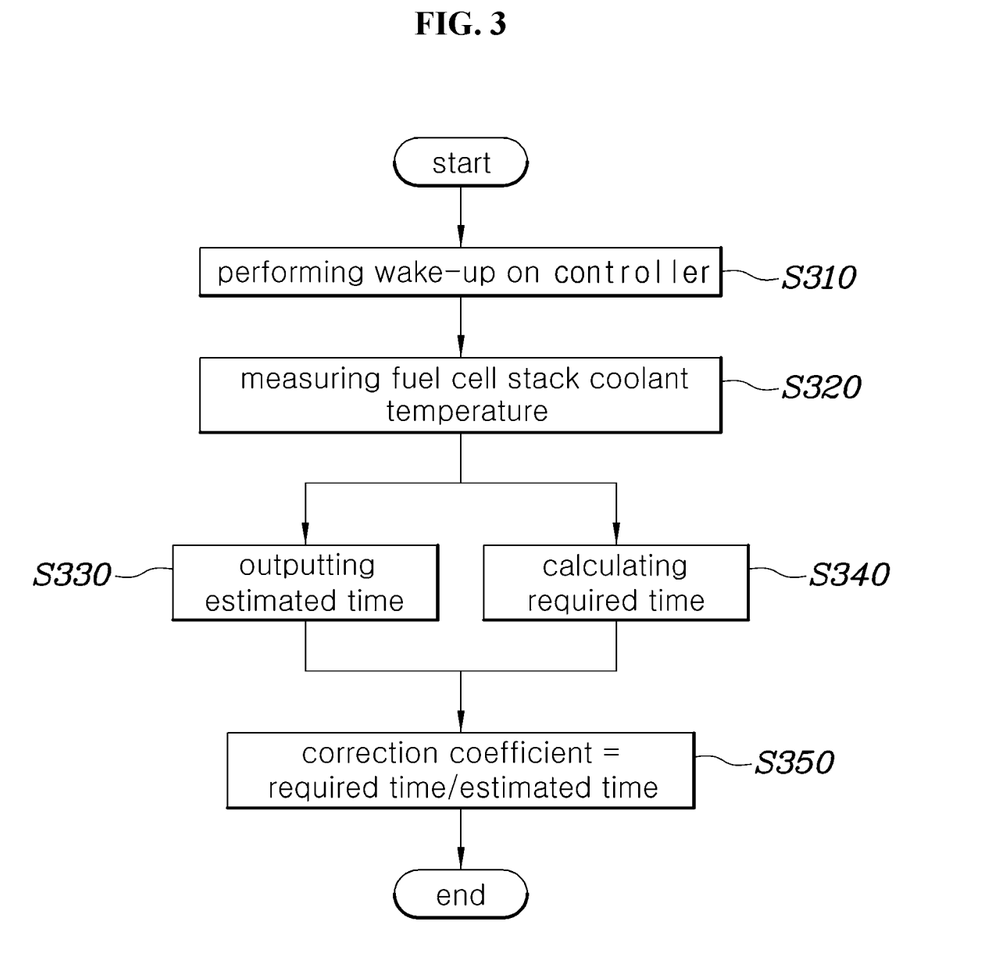
FIG. 3 is a detailed flowchart illustrating a step of deriving an estimated time and a required time in the control step of the controller of FIG. 2 according to an embodiment of the present disclosure.

FIG. 1 is a configuration diagram illustrating a cold start control system for a fuel cell vehicle according to an embodiment of the present disclosure, FIG. 2 is a flowchart illustrating a cold start control method for a fuel cell vehicle, which is performed by a controller, according to an embodiment of the present disclosure, and FIG. 3 is a detailed flowchart illustrating a step of deriving an estimated time and a required time in the control step of the controller of FIG. 2 according to an embodiment of the present disclosure.

FIG. 1 is a configuration diagram illustrating a cold start control system for a fuel cell vehicle according to an embodiment of the present disclosure. The cold start control system for a fuel cell vehicle according to an embodiment of the present disclosure includes a coolant temperature sensor 120 configured to measure a temperature of a coolant for a fuel cell stack, and a controller 300 configured to control the fuel cell system in order to calculate a target heating value according to the temperature of the fuel cell stack coolant when the fuel cell vehicle enters a cold start mode, to derive an estimated time that is estimated to be required until a stopped vehicle coolant temperature, which is measured in a state in which the vehicle is stopped prior to being started, to reach a reference temperature, by deriving a required time that is required from a point of time at which the stopped vehicle coolant temperature is measured to a point of time at which the stopped vehicle enters the cold start mode, to correct the target heating value according to a ratio between the estimated time and the required time, and to derive a final target heating value, and to cause the heating value from the fuel cell stack to reach the final target heating value.

The controller 300 according to an embodiment of the present disclosure can be realized by any one of an algorithm configured to control operations of various components of the vehicle and a non-volatile memory (not illustrated) configured to store data related to software instructions for refreshing the algorithm, and by a processor (not illustrated) configured to conduct operations described below using the data stored in the memory. Here, the memory and the processor can be embodied into individual chips. Alternatively, the memory and the processor may be embodied into a single chip integrated therewith, and the processor may take a type of one or more processors.

The coolant temperature sensor 120 measures, first, the temperature of the fuel cell stack coolant when the vehicle is started. Afterwards, the coolant temperature sensor 120 transmits the measured temperature to a receiver for the fuel cell stack coolant temperature sensor of the controller 300. In the controller 300, it is determined whether or not the fuel cell vehicle enters the cold start mode according to the temperature of the fuel cell stack coolant. In the controller 300, when the coolant temperature is compared with a reference temperature and is remarkably low, this is determined as the cold start, and proceeds to enter a cold start sequence. When the fuel cell vehicle enters the cold start, the controller 300 calculates the target heating value for the fuel cell stack according to the temperature of the fuel cell stack coolant. Since the fuel cell performs an exothermic reaction in the event of electricity generation, the fuel cell induces its own heat emission by means of the electricity generation, and generates heat required for the cold start through this process.

Meanwhile, in the controller 300, when the target heating value is derived through only the temperature of the coolant, the target heating value may be different from the degree of actual requirement for the cold starting of the fuel cell. Thus, the target heating value needs to be corrected. When the fuel cell vehicle enters the stop state, the temperature of the fuel cell stack coolant and the temperature inside the fuel cell stack are lowered. When the stop time of the fuel cell vehicle is long, the temperature of the fuel cell stack coolant and an internal temperature of the fuel cell stack may be lowered to a similar level. For this reason, when the fuel cell vehicle enters the cold start mode, it is suitable to derive the target heating value for the fuel cell stack according to the temperature of the fuel cell stack coolant. However, when the stop time of the fuel cell vehicle is short, there may be a difference between a rate at which the temperature of the fuel cell stack coolant is lowered and a rate at which the internal temperature of the fuel cell stack is lowered. Accordingly, when the target heating value for the fuel cell stack is derived according to the temperature of the fuel cell stack coolant when the fuel cell vehicle enters the cold start mode, there is a problem in that more heat emission than necessary should be induced from the fuel cell stack.

Further, the controller 300 derives the estimated time that is estimated to be required until the stopped vehicle coolant temperature, which is measured in the state in which the fuel cell vehicle is stopped prior to being started, reaches the reference temperature, and derives a required time that is required from a point in time when the stopped vehicle coolant temperature is measured to a point in time when the fuel cell vehicle enters the cold start mode. In any case, there is a problem in that the temperature of the fuel cell stack coolant is measured in the state in which the fuel cell vehicle is stopped is represented by the internal temperature of the fuel cell stack. Further, a change in temperature may always be different due to an influence of an ambient environment. However, the time varies in a fixed direction without the influence of the ambient environment. Accordingly, an attempt is made to solve the problem by making use of a time required from the time required until the temperature of the fuel cell stack coolant, which is measured in the state in which the fuel cell vehicle is stopped, reaches the reference temperature, and by making use of a time required from a point in time at which the temperature of the fuel cell stack coolant is measured to a point in time at which the fuel cell vehicle enters the cold start mode.

Further, the controller 300 derives a final target heating value by correcting the target heating value according to a ratio between the estimated time and the required time, and determines to allow the heating value of the fuel cell stack to reach the final target heating value. In deriving the target heating value of the fuel cell stack, the heating value is corrected by reflecting a situation of the internal temperature of the fuel cell stack, and thereby a heating value required for the heat emission of the fuel cell stack is finally derived. Thereby, it is possible to reduce unnecessary heat emission of the fuel cell stack, and to prevent a durability drop and deterioration of the fuel cell stack.

Finally, when the heating value of the fuel cell stack reaches the final target heating value, the controller 300 determines that the cold start is completed. Afterwards, the vehicle is started by operating a COD (Cathode Oxygen Depletion) heater 400 or an end cell heater 500, which is illustrated in FIG. 1, and then the fuel cell system is allowed to perform a normal operation.

Meanwhile, FIG. 2 is a flowchart for the cold start control method for a fuel cell vehicle, which is performed by a controller, and FIG. 3 is a detailed flowchart illustrating a step of deriving an estimated time and a required time at the controller.

FIG. 2 is a flowchart for the cold start control method for a fuel cell vehicle in accordance with an embodiment of the present disclosure, in which the cold start control method includes a step S100 of, by a controller, determining whether or not the vehicle enters a cold start mode when the vehicle is started. A step S200 of, by the controller, calculating a target heating value according to a temperature of the fuel cell stack coolant when the vehicle enters the cold start mode. A step S300 of, by the controller, deriving an estimated time that is estimated to be required until a stopped vehicle coolant temperature, which is measured in a state in which the vehicle is stopped prior to being started, and deriving a required time that is required from a point of time at which the stopped vehicle coolant temperature is measured to a point of time at which the stopped vehicle enters the cold start mode. A step S400 of, by the controller, correcting the target heating value according to a ratio between the estimated time and the required time, and thereby deriving a final target heating value. and A step S500 of, by the controller, controlling the fuel cell system such that the heating value from the fuel cell stack reaches the final target heating value.

In FIG. 2, the step S100 of determining whether or not the vehicle enters a cold start mode when the vehicle is started includes determining whether or not to enter a cold start mode on the basis of the coolant temperature measured from the fuel cell stack coolant temperature sensor 120. When the coolant temperature measured from the fuel cell stack is equivalent to be less than or equal to the reference temperature at which it is determined that the vehicle enters the cold start mode, the vehicle is allowed to enter the cold start mode.

In the step S200 of calculating the target heating value, a plurality of temperature regions may exist. Further, the target heating value can be calculated according to a temperature region to which the temperature of the fuel cell stack coolant when the vehicle enters the cold start mode belongs. Here, the temperature region may be set according to each of the sections based on the fuel cell stack coolant temperature and may have a plurality of temperature regions. Only a single temperature region is not set, but a wide temperature region is divided into a plurality of temperature regions according to each temperature section. Thereby, a temperature region corresponding to the temperature of the fuel cell stack coolant is made to be variously changed. Further, the present disclosure relates to the cold start mode of the fuel cell vehicle. Thereby, a plurality of temperature regions are allowed to be set in a cryogenic temperature region and a low temperature region.

Further, in the step S200 of calculating a target heating value, a minimum heating value is calculated as a basic value in the plurality of temperature regions, and the temperature is lowered. Thereby, the target heating value can be increased. When the fuel cell vehicle enters the cold start mode, the target heating value needs to be calculated as the minimum value in order to emit heat from the fuel cell stack. However, in the case of corresponding to the cryogenic temperature region among the plurality of temperature regions, the heat emission from the fuel cell stack is insufficiently generated, and thus it is necessary to increase the target heating value. On the basis of this derived target heating value, the heat emission from the fuel cell stack is induced.

When the stop interval of the fuel cell vehicle is short, the temperature of the fuel cell stack coolant can be sharply changed by an outdoor temperature, but a temperature inside the fuel cell stack is difficult to be sharply changed. Accordingly, when the heat emission from the fuel cell stack is induced by deriving the target heating value from only the temperature of the fuel cell stack coolant, there is a problem in that the fuel cell stack is lowered in durability or undergoes degradation. Accordingly, it is necessary to optimize the target heating value by comparing the estimated time, which is required until the internal temperature of the temperature of the fuel cell stack coolant during the stop of the vehicle, with a real required time required until the fuel cell vehicle enters the cold start mode during a stop.

Thus, in step S300 of deriving a time in FIG. 2, a data table that receives the temperature of the fuel cell stack coolant and the outdoor temperature and then outputs the estimated time can be utilized. The estimated time refers to a time that, on the basis of the temperature of the fuel cell stack coolant and the outdoor temperature, the internal temperature of the fuel cell stack is required until it is dropped to the temperature region of the fuel cell stack coolant. The estimated time is derived through a test for checking a change in the internal temperature of the fuel cell stack while changing the temperature of the fuel cell stack coolant and the outdoor temperature. The derived estimated time may be stored in a data table format by changing the temperature of the fuel cell stack coolant and the outdoor temperature into data. For example, as illustrated in FIG. 1 above, when entering the cold start mode, a temperature is input by an outdoor temperature sensor 110 and the fuel cell stack coolant temperature sensor 120, and then the estimated time corresponding to the input temperature is output from the data table. Further, to correspond to the plurality of temperature regions, a plurality of data tables for the estimated time may be provided. To output the estimated time according to a temperature of the fuel cell stack coolant and a change of the outdoor temperature, the plurality of data tables for the estimated time need to exist so as to correspond to the plurality of temperature regions.

Further, in step S300 of deriving a time, a time required from a point in time when the stopped vehicle coolant temperature is measured to a point in time when the fuel cell vehicle enters the cold start mode. The required time is a time that is required from a point in time when the temperature of the fuel cell stack coolant is measured to a point in time when the fuel cell vehicle enters the cold start mode.

In step S400 of deriving the final target heating value in FIG. 2, the target heating value may be corrected using a ratio of the required time to the estimated time. A correction coefficient for correcting the target heating value is a ratio of the required time to the estimated time. The final target heating value of the fuel cell stack can be derived by multiplying the obtained correction coefficient to the target heating value.

In step S500 of controlling the fuel cell system, when the final target heating value required for the fuel cell stack is derived, the fuel cell stack starts internal heat emission. A chemical reaction within the fuel cell stack is generated using hydrogen that is fuel. In this case, the chemical reaction induces heat emission from the fuel cell stack by an exothermic reaction. A heating value generated from the fuel cell stack is accumulated due to continuous fuel consumption. The heat emission is induced by consuming fuel at the fuel cell stack so as to reach the final target heating value at which the accumulated heating value of the fuel cell stack is corrected. Afterwards, if it is determined that the accumulated heating value of the fuel cell stack reaches the final target heating value, this step is finished to proceed to the next step. Finally, when it is determined that the cold start mode does no longer need to proceed through the cold starting completing step S600, the cold starting control of the fuel cell vehicle is completed at the controller.

Meanwhile, FIG. 3 is a detailed flowchart illustrating a step of deriving an estimated time and a required time in the control step of FIG. 2 according to an embodiment of the present disclosure. The detailed flowchart of FIG. 3 is targeted to obtain a correction coefficient. The estimated time is output based on the fuel cell stack coolant temperature and the outdoor temperature which are measured when the fuel cell vehicle enters the cold start mode. Further, the required time corresponds to a time that is required from a point in time when the fuel cell stack coolant temperature is measured to a time when the fuel cell vehicle enters the cold start mode. In this way, the temperature of the fuel cell stack coolant takes part in the estimated time and the required time. However, when the time for which the fuel cell vehicle is stopped in a low temperature or an extremely low temperature environment is increased, the temperature of the fuel cell stack coolant and the outdoor temperature are rapidly changed from time to time. For this reason, an error is generated from the estimated time and the required time which are derived when the fuel cell vehicle enters the cold start mode, and there is a problem in that the target heating value is corrected using a ration between the estimated time and the required time. Thus, in step S300 of deriving the time in FIG. 1, during the stop of the fuel cell vehicle stop, the controller 300 is subjected to wake-up in each control period, and it is necessary to derive the estimated time whenever the controller is subjected to wake-up.

In step S310 of the wake-up of the controller illustrated in FIG. 3, the controller 300 is subjected to wake-up through the wake-up unit 200 illustrated in FIG. 1. Afterwards, it is necessary to cope with a change in the temperature of the fuel cell stack coolant and the outdoor temperature. After the controller 300 is subjected to wake-up, a step S320 of measuring the temperature of the fuel cell stack coolant is performed. The temperature of the fuel cell stack coolant is measured through the fuel cell stack coolant temperature sensor 120 of the sensor unit 100 illustrated in FIG. 1, and the outdoor temperature is measured through an outdoor temperature sensor 110. A step S330 of outputting the estimated time on the basis of both the measured temperature of the fuel cell stack coolant and the outdoor temperature is performed.

However, when a change in the temperature of the fuel cell stack coolant is large in comparison with the preceding wake-up, a periodic time may be set to be short. By setting the wake-up periodic time to be short, an estimated time, which corresponds to an abruptly changed temperature of the fuel cell stack coolant, makes it possible to be accurately derived.

In step S330 of outputting the estimated time, a process of storing only data for one estimated time without all the estimated times derived whenever the controller 300 is periodically waked-up is needed. When the estimated time is derived whenever the controller 300 is periodically subjected to wake-up, there is a problem in that the derived data for the estimated time is accumulated, and that data to be used when the correction coefficient is obtained is not clear. Accordingly, when the estimated time is derived whenever the controller 300 is subjected to wake-up, data for the estimated time in the event of previous wake-up can be deleted, and derived new data for the estimated time can be stored. The estimated time is decided definitely decided as one data, thereby no error is made in deriving the correction coefficient due to the accumulation of the data for the estimated time.

Further, the estimated time derived in every period in which the controller 300 is subjected to wake-up may one data that corresponds to each temperature region in a data table to which a plurality of temperature regions are provided. When the controller 300 is subjected to wake-up, the temperature region corresponding to the temperature of coolant for fuel cell stack is changed depending on the temperature of the fuel cell stack coolant and the outdoor temperature. Thus, a data table for the estimated times in a temperature region corresponding to the temperature of the fuel cell stack coolant needs to exist. Further, it is necessary to derive one estimated time that satisfies a condition of the temperature of the fuel cell stack coolant and a condition of the outdoor temperature in the relevant data table.

In step S340 of calculating a required time in FIG. 3, the periodic time for which the controller 300 is subjected to wake-up is applied, and thereby a point in time when the required time is calculated is changed. The point in time when the required time is calculated is a point in time when the temperature of the fuel cell stack coolant is measured. However, the controller 300 is periodically subjected to wake-up, and thereby the temperature of the fuel cell stack coolant in the vehicle stop state is periodically measured, and there is a fear that the point in time when the temperature of the fuel cell stack coolant is calculated is changed variously. Accordingly, there is a need that, when the controller 300 is finally subjected to wake-up, the point in time when the temperature of the fuel cell stack coolant is measured is applied as the point in time when the required time is calculated.

Meanwhile, step S350 of deriving a correction coefficient makes good use of the estimated time and the required time which are derived in the previous steps, i.e. both step S330 of outputting the estimated time and step S340 of calculating the required time. The correction coefficient is decided by a ratio between the estimated time, which is derived on the basis of the point in time when the controller 300 is finally subjected to wake-up from the periodic time, and the required time which is really taken until the fuel cell vehicle enters the cold start mode. However, the required time cannot be calculated as 0(zero), and the correction coefficient cannot be also decided as 0(zero). When the correction coefficient becomes 0(zero), a final target heating value to be finally calculated becomes 0(zero). For this reason, there occurs a problem with the heat emission from the fuel cell stack. Further, the correction coefficient cannot exceed 1. To reduce an error made when the stop time of the fuel cell vehicle is increased, the periodic time for which the controller 300 is subjected to wake-up is set to make an attempt to cope with a change in temperature that occurs for a long stop time of the fuel cell vehicle. Accordingly, it is characterized that the required time cannot exceed the estimated time stored as data, and that the correction coefficient has a ratio value between 0 and 1 by means of a ratio between the estimated time and the required time.

According to the cold start control method and system for the fuel cell vehicle of the present disclosure, the estimated time, for which the internal temperature of the fuel cell stack enters the temperature region on the basis of the temperature of the fuel cell stack coolant and the outdoor temperature, is changed into data, and the target heating value is optimized through a ratio between the estimated time and the required time that is taken until it is determined that the fuel cell vehicle really enters the cold start mode. Thereby, the present disclosure has an effect of preventing unnecessary heat emission from the fuel cell stack and deterioration of durability of the fuel cell stack.

Further, by optimizing the target heating value, the present disclosure has an effect of preventing fuel consumption caused by unnecessary use of the fuel.

Although the present disclosure is illustrated and described in relation to specific embodiments, the present disclosure can be modified and changed without departing the technical idea thereof, which will be apparent to those having ordinary knowledge in the field of art to which the present disclosure belongs.

The invention claimed is:

1. A cold start control method for fuel cell vehicles, the method comprising:
   determining, by a controller, whether to enter a cold start mode when a fuel cell vehicle is started;
   calculating, by the controller, a target heating value according to a fuel cell stack coolant temperature when the fuel cell vehicle enters the cold start mode;
   deriving, by the controller, an estimated time that is estimated to be required until a stopped vehicle coolant temperature measured in a state in which the fuel cell vehicle is stopped before being started reaches a reference temperature, and deriving a time that is required from a point in time when the stopped vehicle coolant temperature is measured to a point in time when the fuel cell vehicle enters the cold start mode;
   correcting, by the controller, the target heating value according to a ratio between the estimated time and the required time to derive a final target heating value; and
   controlling, by the controller, the fuel cell system such that the heating value of the fuel cell stack reaches the final target heating value.

2. The cold start control method of claim 1, wherein the calculation of the target heating value has a plurality of temperature regions, and includes calculating the target heating value according to each of the temperature regions to which the temperature of the fuel cell stack coolant belongs when the fuel cell vehicle enters the cold start mode.

3. The cold start control method of claim 2, wherein the plurality of temperature regions are set according to each section based on the fuel cell stack coolant temperature.

4. The cold start control method of claim 2, wherein a minimum heating value is calculated as a basic value in the plurality of temperature regions, and the temperature is lowered, thereby the target heating value is increased.

5. The cold start control method of claim 1, wherein the deriving of the time includes receiving the fuel cell stack coolant temperature and an outdoor temperature to create a data table for outputting the estimated time.

6. The cold start control method of claim 5, wherein the data table of the estimated times corresponds to the plurality of temperature regions.

7. The cold start control method of claim 1, wherein, in the deriving of the time, the controller is subjected to wake-up in every control period during vehicle stop, and the estimated time is derived whenever the controller is subjected to wake-up.

8. The cold start control method of claim 7, wherein, when a change in the temperature of the fuel cell stack coolant is large in comparison with a previous wake-up, a time period for which the controller is subjected to wake-up is set to be shorter than the previous wake-up.

9. The cold start control method of claim 7, wherein, when the estimated time is derived whenever the controller performs the wake-up, the estimated time data derived at the time of a previous wake-up is eliminated, and newly derived estimated time data is stored.

10. The cold start control method of claim 7, wherein the derived estimated time is one data that corresponds to each temperature region in the data table having the plurality of temperature regions.

11. The cold start control method of claim 1, wherein, in the deriving of the time, the point in time when the stopped vehicle coolant temperature of the required time corresponds to a point in time when the estimated time is finally derived during a stop of the fuel cell vehicle.

12. The cold start control method of claim 1, wherein the deriving of the final target heating value includes comparing the ratio of the required time to the estimated time as a correction coefficient.

13. The cold start control method of claim 12, wherein the final target heating value is corrected by multiplying an existing target heating value by the correction coefficient.

14. A cold start control system for fuel cell vehicles, the system comprising:
- a coolant temperature sensor configured to measure a fuel cell stack coolant temperature; and
- a controller configured to:
- calculate a target heating value according to the temperature of the fuel cell stack coolant when the fuel cell vehicle enters a cold start mode;
- derive an estimated time estimated to be required until the fuel cell stack coolant temperature, which is measured in a state in which the fuel cell vehicle is stopped before being started reaches a reference temperature;
- derive a required time that is required from a point in time at which the stopped vehicle coolant temperature is measured to a point in time at which the fuel cell vehicle enters the cold start mode;
- correct the target heating value to derive a final target heating value according to a ratio between the estimated time and the required time; and
- control the control system such that a fuel cell stack heating value reaches the final target heating value.

* * * * *